United States Patent
Schmitt et al.

(10) Patent No.: US 9,027,249 B2
(45) Date of Patent: May 12, 2015

(54) METHOD FOR PRODUCING A LEAD-FREE SLIDING BEARING

(75) Inventors: Holger Schmitt, Pfungstadt (DE);
Daniel Meister, Mainz-Kastel (DE);
Roman Lewandowski, Gdansk (PL);
Andrzej Broniszewski, Gdansk (PL)

(73) Assignee: Federal Mogul Wiesbaden GmbH, Wiesbaden (DE)

( * ) Notice: Subject to any disclaimer, the term of this patent is extended or adjusted under 35 U.S.C. 154(b) by 401 days.

(21) Appl. No.: 13/703,137

(22) PCT Filed: Jun. 10, 2010

(86) PCT No.: PCT/EP2010/058145
§ 371 (c)(1),
(2), (4) Date: Feb. 18, 2013

(87) PCT Pub. No.: WO2011/154039
PCT Pub. Date: Dec. 15, 2011

(65) Prior Publication Data
US 2013/0139390 A1   Jun. 6, 2013

(51) Int. Cl.
*C22C 9/00* (2006.01)
*B23P 15/00* (2006.01)
*C22C 1/04* (2006.01)
*C22C 9/02* (2006.01)
*F16C 33/12* (2006.01)

(52) U.S. Cl.
CPC .......... *B23P 15/003* (2013.01); *Y10T 29/49709* (2013.01); *F16C 2204/12* (2013.01); *C22C 1/0425* (2013.01); *C22C 9/02* (2013.01); *F16C 33/121* (2013.01); *Y02T 10/865* (2013.01); *F16C 2204/10* (2013.01)

(58) Field of Classification Search
CPC ....... B23P 15/003; C22C 1/0425; C22C 9/02; F16C 33/121; F16C 2204/10; F16C 2204/12
See application file for complete search history.

(56) References Cited

U.S. PATENT DOCUMENTS

| | | | |
|---|---|---|---|
| 2,887,765 A | 5/1959 | Thomson et al. | |
| 4,822,560 A * | 4/1989 | Oyama et al. | 420/470 |
| 5,824,923 A * | 10/1998 | Kondoh et al. | 75/247 |
| 5,976,214 A * | 11/1999 | Kondoh et al. | 75/244 |
| 2003/0099853 A1 | 5/2003 | Takayama et al. | |
| 2009/0263053 A1* | 10/2009 | Andler | 384/42 |
| 2010/0072584 A1* | 3/2010 | Aruga et al. | 257/666 |

FOREIGN PATENT DOCUMENTS

| | | |
|---|---|---|
| DE | 102005014302 | 10/2006 |
| DE | 102007049383 | 4/2009 |
| EP | 1619263 A1 | 1/2006 |
| EP | 1698707 A | 9/2006 |
| GB | 2459427 A | 10/2009 |
| WO | WO-2010/128076 A1 | 11/2010 |

OTHER PUBLICATIONS

Data from Scopp—FactSage copper alloy database, www.factsage.cn, Dec. 7, 2012, 1 page, drawing.

* cited by examiner

*Primary Examiner* — Alexander P Taousakis
(74) *Attorney, Agent, or Firm* — Robert L. Stearns; Dickinson Wright, PLLC

(57) ABSTRACT

In a method for producing a lead-free sliding bearing, a copper-based material comprising a total of 0.1% to 3% of the elements aluminum, magnesium, silicon, titanium, zircon, and chromium is sintered. Additionally, up to 15% tin can be included in order to ensure optimal properties for use in the internal combustion engine.

12 Claims, No Drawings

METHOD FOR PRODUCING A LEAD-FREE SLIDING BEARING

BACKGROUND OF THE INVENTION

1. Technical Field

The invention relates to a method for producing a lead-free sliding bearing.

2. Related Art

A wide variety of requirements are placed on sliding bearings. These concern, for example, the corrosion resistance, the sliding properties and the machinability.

PRIOR ART

DE 10 2007 049 383 A1 relates to a composite material and a method for the production thereof, which consists of a steel substrate and a coating of a hardenable copper alloy that is applied by means of roll bonding.

Apparent from DE 10 2005 014 302 A1 is a method for the production of a sliding bearing made of a copper-multicomponent alloy, in which at least one phase constituent at the sliding surface is dissolved out by means of an acid.

SUMMARY OF THE INVENTION

The object forming the basis for the invention is to provide a method for the production of a sliding bearing, by means of which sliding bearings having improved properties, in particular as regards corrosion resistance, can be produced.

DETAILED DESCRIPTION

According thereto, a copper-based material comprising a total of 0.1% to 3% by weight of the elements aluminium, magnesium, silicon, titanium, zirconium and chromium is sintered. In order to produce the sliding bearing, such an alloy can be sintered in particular onto a steel backing. The cited elements hereby act in an advantageous manner as corrosion inhibitors. It has been found that the novel material can be produced in existing sintering plants at a sintering temperature of up to 1000° C. It is furthermore mentioned that in order to produce in an economically favourable manner, for example in an atomising process, the sintering powder of the composition Cu(Sn)X, wherein X=aluminium, magnesium, silicon, titanium, zirconium, chromium, which is required within the scope of the invention, the use of chips is conceivable. As standard, all % values referenced herein are by weight.

It was found in initial tests that the desired protection against corrosion already occurs at concentrations of the cited elements of at least 0.2% and/or at most 1%.

In an advantageous manner, the novel material can furthermore contain up to 15%, in particular approximately 6%, of tin. By means hereof, the hardness and the sliding properties can advantageously be adjusted in accordance with the requirement profile. The upper limit of the tin proportion results from the fact that an increased proportion of tin reduces heat conductivity. In order to thus achieve a sufficiently high heat conductivity, the specified limiting values have proven to be advantageous.

The sliding properties and the machinability of the sliding bearing produced according to the invention can be improved in an advantageous manner by adding hard particles, such as, for example, oxides, carbides, nitrides and phosphides, and/or solid lubricants, such as, for example, h-BN and carbon, when producing the powder for the sintering process. Furthermore, so-called chip breakers can be added in a process prior to sintering.

It has furthermore proven to be advantageous to mix the novel material as described herein of the type CuX, wherein X=Al, Mg, Si, Ti, Zr, Cr, with tin and/or copper powder prior to sintering. As a result hereof, a material is produced which can be sintered particularly well onto steel. The cited elements furthermore act as sintering additives in order to compensate the effect that the described material and the elements acting as corrosion inhibitors passivate in air.

It is possible to lower the sintering temperature in an advantageous manner by the preferred targeted increase of the fine proportion, i.e. particles of <5 μm, to at least 5%. This furthermore offers the advantage that the technically necessary high proportion of fine powder can be used within the scope of the invention without negatively affecting the flow properties.

The invention claimed is:

1. A method for the production of a lead-free sliding bearing, in which a copper-based material comprising a total of 0.1% to 3% by weight of the elements aluminium, magnesium, silicon, titanium, zirconium and chromium is sintered, with the material being mixed with at least one of tin and copper powder prior to sintering.

2. The method according to claim 1, wherein characterised in that the material contains a total of at least 0.2% by weight of the elements aluminium, magnesium, silicon, titanium, zirconium and chromium.

3. The method according to claim 1, wherein the material contains up to 15% by weight of tin.

4. The method according to claim 1, wherein the material furthermore contains a solid lubricant.

5. The method according to claim 1, wherein the material furthermore contains hard particles.

6. The method according to claim 1, wherein the material furthermore contains chip breakers.

7. The method according to claim 1, wherein the material comprises at least 5% of particles having a size of <5 μm.

8. The method according to claim 1, wherein the material is mixed with tin and copper powder prior to sintering.

9. The method according to claim 1, wherein the material contains a total of at most 1% by weight of the elements aluminium, magnesium, silicon, titanium, zirconium and chromium.

10. The method according to claim 1, wherein the material contains about 6% by weight tin.

11. The method of claim 4, wherein the solid lubricant selected from the list consisting of h-BN and C.

12. The method according to claim 5, wherein the hard particles comprises at least one selected from the group consisting of carbides, nitrides and phosphides.

* * * * *